(12) United States Patent
Ren et al.

(10) Patent No.: US 7,115,876 B2
(45) Date of Patent: Oct. 3, 2006

(54) IMAGING ARRAY AND METHODS FOR FABRICATING SAME

(75) Inventors: Baorui Ren, Andover, MA (US); William Robert Ross, Scotia, NY (US)

(73) Assignee: General Electric Company, Schenectady, NY (US)

(*) Notice: Subject to any disclaimer, the term of this patent is extended or adjusted under 35 U.S.C. 154(b) by 189 days.

(21) Appl. No.: 10/613,061

(22) Filed: Jul. 2, 2003

(65) Prior Publication Data

US 2004/0114711 A1 Jun. 17, 2004

Related U.S. Application Data

(63) Continuation-in-part of application No. 10/308,233, filed on Dec. 2, 2002.

(51) Int. Cl.
*G01T 1/20* (2006.01)

(52) U.S. Cl. .................. 250/366; 250/367; 250/370.11

(58) Field of Classification Search ................ 250/366, 250/367, 370.11
See application file for complete search history.

(56) References Cited

U.S. PATENT DOCUMENTS

| | | | | |
|---|---|---|---|---|
| 4,187,427 A | * | 2/1980 | Cusano | .................. 250/370.09 |
| 4,303,860 A | * | 12/1981 | Bjorkholm et al. | .... 250/363.02 |
| 5,144,141 A | | 9/1992 | Rougeot et al. | |
| 5,231,654 A | | 7/1993 | Kwasnick et al. | |
| 5,231,655 A | | 7/1993 | Wei et al. | |
| 5,293,417 A | | 3/1994 | Wei et al. | |
| 5,303,282 A | | 4/1994 | Kwasnick et al. | |
| 5,430,298 A | | 7/1995 | Possin et al. | |
| 5,510,622 A | * | 4/1996 | Hu et al. | ..................... 250/367 |
| 5,696,850 A | | 12/1997 | Parulski et al. | |
| 6,167,110 A | | 12/2000 | Possin et al. | |

* cited by examiner

*Primary Examiner*—Constantine Hannaher
(74) *Attorney, Agent, or Firm*—Armstrong Teasdale LLP

(57) ABSTRACT

A radiation detector includes a first array including a first photon incident surface, a second array including a second photon incident surface, and a scintillator array extending from the first photon incident surface to the second photon incident surface. The second detector offsets from the first detector by approximately one-half detector pitch normal to an incident x-ray direction.

19 Claims, 3 Drawing Sheets

IMAGING ARRAY AND METHODS FOR FABRICATING SAME

CROSS REFERENCE TO RELATED APPLICATION

This application is a continuation-in-part of U.S. patent application Ser. No. 10/308,233 filed Dec. 2, 2002.

BACKGROUND OF THE INVENTION

This invention relates generally to radiation imaging systems and in particular to x-ray radiography imaging systems.

Imaging arrays typically include a photosensor array coupled to a scintillating medium. Radiation absorbed in the scintillator generates optical photons which in turn pass into a photosensor, such as a photodiode. To increase resolution, some known imaging systems utilize a dynamic focal spot wobble technique which increases a computed tomography imaging system resolution by manipulating the position of an x-ray focal spot during data acquisition. Other known imaging systems increase a resolving power of the imaging system by combining projection data that are scanned 180 degrees apart. At least one known imaging array includes a photodiode panel with a pitch size of approximately 100 microns that can only achieve a resolution as high as 5 lp/mm (line pairs per millimeter) from a single measurement due to limits set by the sampling rate and the corresponding Nyquist frequency. For example, in signal processing, an ideal detector with an aperture size of d has a frequency resolving power up to 1/d in a Fourier domain before its Modulation Transfer Function (MTF) curve of a SINC function hits its first zero node. At least one known linear array detector with a pitch size of d can only resolve a spatial frequency up to the Nyquist frequency 1/2 d, if only one measurement is taken.

BRIEF SUMMARY OF THE INVENTION

In one aspect, a radiation detector is provided. The radiation detector includes a first array including a first photon incident surface, a second array including a second photon incident surface, and a scintillator array extending from the first photon incident surface to the second photon incident surface. The first array offsets the second array by one-half detector pitch normal to the incident x-ray direction.

In another aspect, a method for fabricating a radiation detector is provided. The method includes fabricating a first array including a first photon incident surface, fabricating a second array including a second photon incident surface, and positioning the second array with an offset of half of the detector pitch normal to the incident x-ray direction, and positioning a scintillator array between the first array and the second array such that the scintillator extends from the first photon incident surface to the second photon incident surface.

In a further aspect, an x-ray imaging system, e.g. projection radiography or a computed tomography (CT) for generating an image of an object with high resolution is provided. The imaging system includes detector array and one radiation source, object scanning system (rotation or linear motion), and a computer coupled to the detector array, scanning mechanism, and the radiation source. The detector array includes a first array of detector pitch (d), and a second array of detector pitch (d) equivalent to the first detector pitch, the second detector offset from the first detector by approximately one-half detector pitch normal to the incident x-ray direction. The computer is configured to sample the first array and the second array simultaneously, and reconstruct an image of the object with higher resolution by interleaving data of the first array samples and the second array samples.

DETAILED DESCRIPTION OF THE INVENTION

Figure 1:
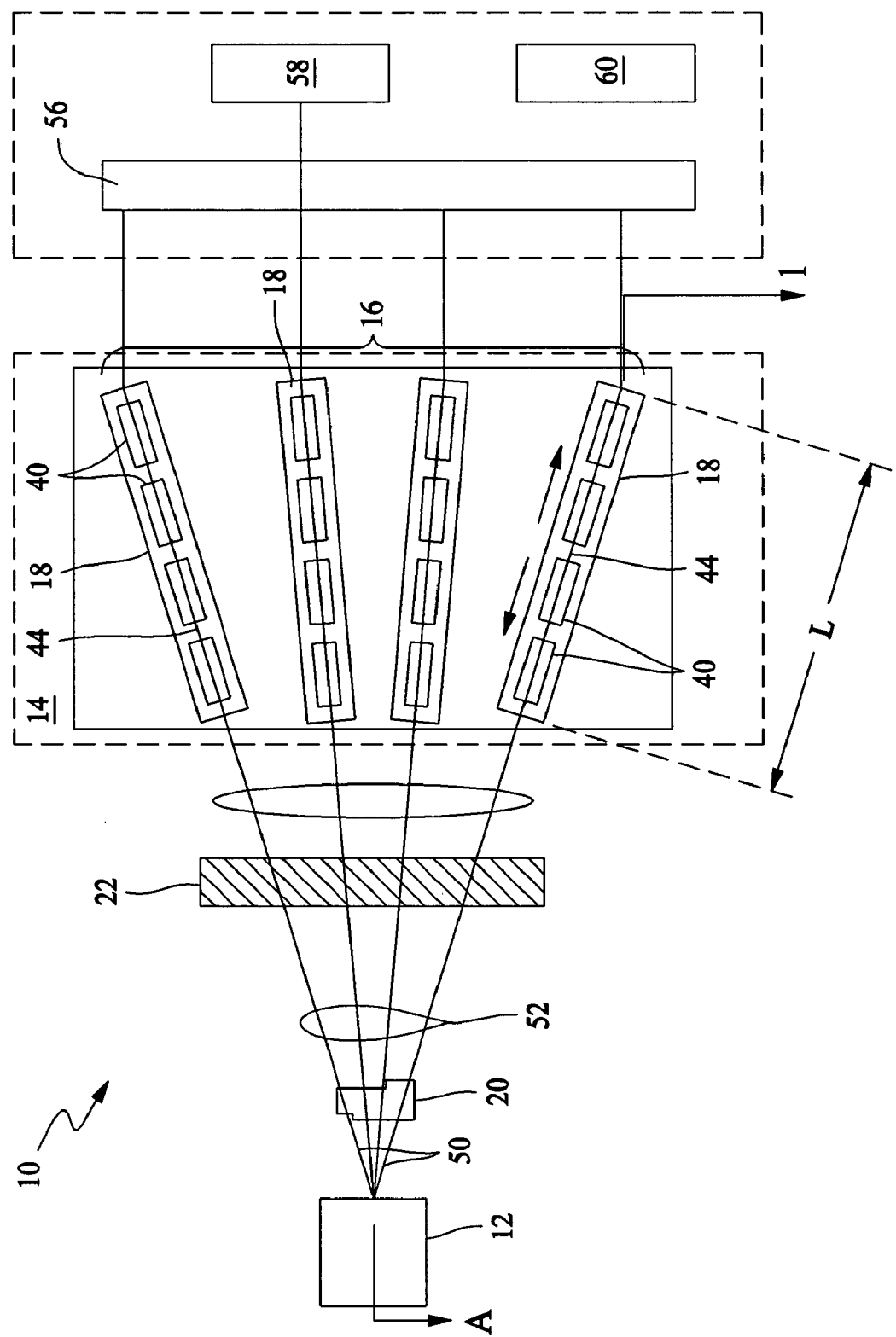
FIG. 1 is an imaging system including an x-ray source, object, and an x-ray detector.
Figure 2:
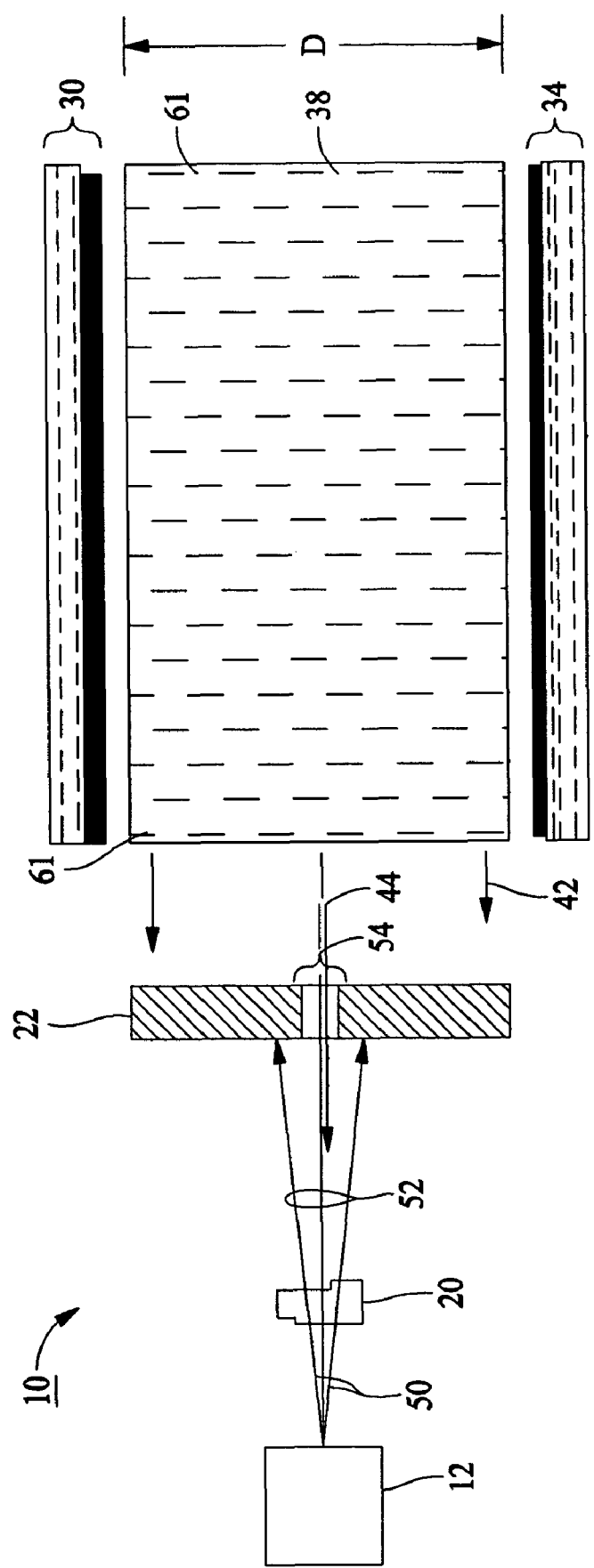
FIG. 2 is a side-sectional view of the detector shown in FIG. 1.
Figure 3:
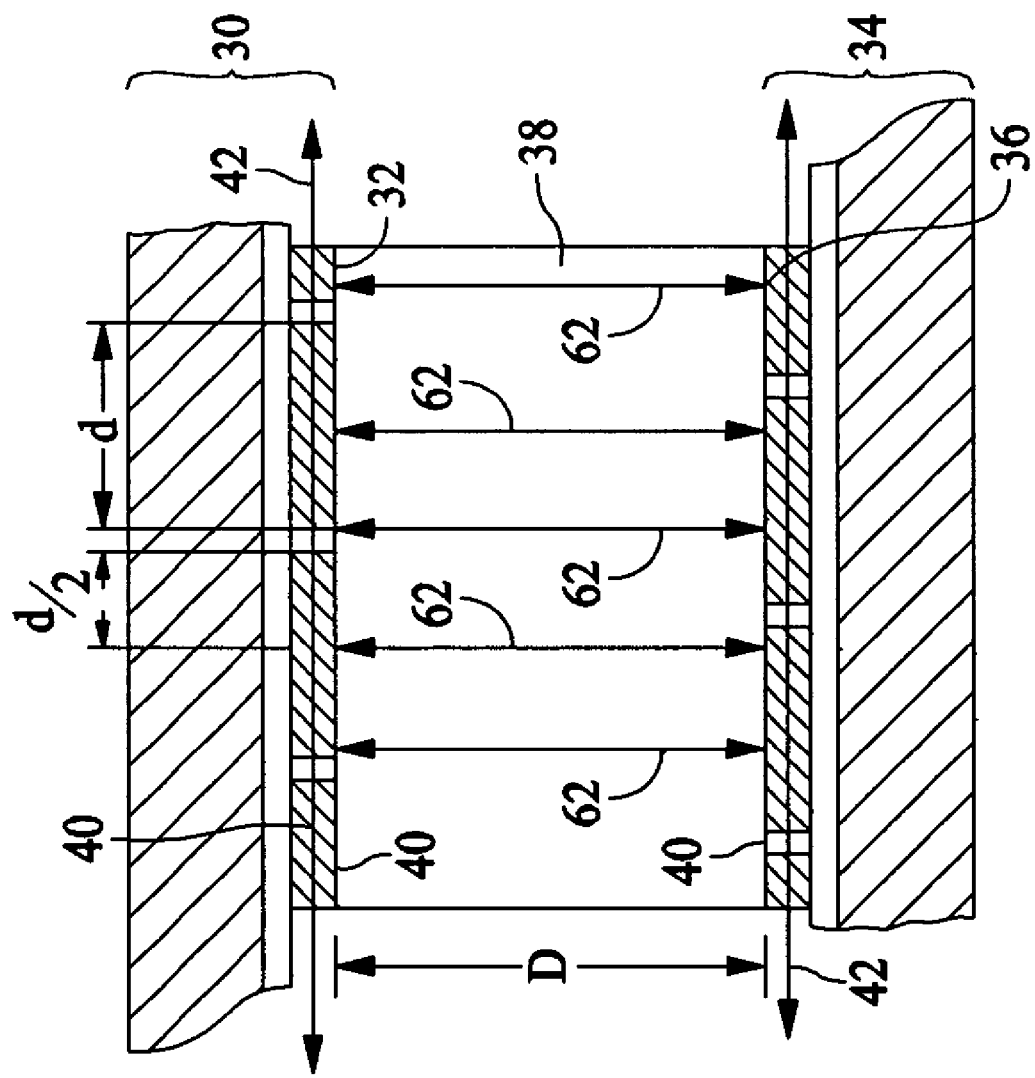
FIG. 3 is a cross-sectional view of the detector normal to the incident x-ray direction shown in FIGS. 1 and 2.

FIG. 1 is an imaging system 10 including an x-ray source 12 and an x-ray detector 14. FIG. 2 is a cross-sectional view of detector 14 shown in FIG. 1. FIG. 3 is a cross-sectional view of detector 14 normal to the incident x-ray direction shown in FIGS. 1 and 2. In an exemplary embodiment, imaging system 10 is a computed tomography (CT) imaging system which the object can be rotated during measurement. X-ray detector 14 includes an array 16 of sensor elements 18. Detector 14 is disposed to receive incident x-rays that have passed through an object 20 that is to be imaged. In one embodiment, imaging system 10 includes a collimator 22 disposed such that x-rays exiting from object 20 pass through collimator 22 before striking x-ray detector 14. The light generated by the absorption of incident x-rays detected by x-ray detector 14 generate an electrical signal corresponding to the incident x-rays.

In an exemplary embodiment, detector 18 includes a first photosensor array 30 including a first photon incident surface 32, a second photosensor array 34 including a second photon incident surface 36, and a scintillator array 38 extending from first photon incident surface 32 to second photon incident surface 36. The light generated by the absorption of incident x-rays in scintillator array 38 is detected by first photosensor array 30 and second photosensor array 34. First photosensor array 30 and second photosensor array 34 each generate an electrical signal corresponding to the incident x-rays detected respectively.

In an exemplary embodiment, sensor element 18 includes a plurality of photosensor devices 40, such as, but not limited to a plurality of photodiodes 40. In one embodiment, each sensor element 18 includes sixty-four photosensitive diodes. Each respective sensor element 18 generally has the same number of photosensitive diodes. In one embodiment, photosensor devices 40 are electrically coupled together in a parallel circuit arrangement.

In one embodiment, photosensors 40 are thin film semiconductors fabricated from at least one of a hydrogenated amorphous silicon, a hydrogenated amorphous germanium, a fluorinated amorphous silicon, a fluorinated amorphous germanium, an alloy including silicon and germanium, and a polycrystalline silicon. Deposited, as use herein, refers to the fabrication of the semiconductor device through successive depositions forming large thin film semiconductor devices. For example, the materials can be deposited in a chemical vapor deposition process and patterned to form the desired components in an array.

In one embodiment, sensor elements 18 include hydrogenated amorphous silicon, hereinafter referred to only as amorphous silicon or a-Si, and are fabricated using known technology for forming large area thin film arrays. Using amorphous silicon for fabricating first photosensor array 30 and second photosensor array 34 facilitates fabricating a large array of respective relatively small diodes on a single substrate, this arrangement facilitates reducing packaging problems and provides an effective large active area responsive to incident light. This arrangement further facilitates providing for a plurality of diode structures in a compact area.

Using amorphous silicon also facilitates reducing common defects in first photosensor array 30 and second photosensor array 34, such as, but not limited to, short circuits between conductive components that are readily repaired with laser ablation techniques. Using amorphous silicon also facilitates reducing damages since X-ray radiation does not damage amorphous silicon devices as much as it damages single crystal devices. As described herein using amorphous silicon facilitates improving both the performance of detector 14 and the efficiency of array fabrication.

By way of example, and not limitation, in one embodiment detector 14 is used for industrial CT purposes (e.g., imaging turbine parts), and includes 2048 focally aligned sensor elements 18 in each first photosensor array 30 and second photosensor array 34. In one embodiment, sensor elements 18 include a pitch of approximately 100 microns (μm), i.e., separation between adjacent sensor elements. The corresponding sensor elements 18 between the first photosensor array 30 and the second photosensor array 34 have an offset of approximately fifty microns normal to an incident x-ray direction. Larger or smaller numbers of sensor elements 18 can be used in detector 14 depending upon the particular use for imaging apparatus 10. In one embodiment, sensor element 18 includes sixty-four separate diodes 40, wherein each diode 40 is approximately 100 μm in width and approximately 500 μm in length. In one embodiment, sensor elements 18 are approximately 32 millimeters (mm) in length. Sensors 18 are disposed along a respective focal axis 44 and have a length of approximately 32 mm to facilitate absorbing the x-rays emitted from source 12. In one embodiment, source 12 operates at a voltage of approximately 200 kilovolts or greater. In another embodiment, source 12 operates at a voltage between approximately 200 kilovolts and approximately 700 kilovolts.

In use, components of imaging system 10 are arranged such that a plurality of x-rays 50 emanating from x-ray source 12 are directed to be incident on object 20 to be imaged. X-rays that pass through object 20 represent the object due to the relative attenuation of the x-rays passing through different portions of object 20. For purposes of illustration only, an x-ray attenuation pattern 52 of a region of interest of object 20 represents those x-rays that have passed through object 20. Attenuation pattern 52 is typically a function of the structure, variations in thickness, and variations in material types of object 20. Attenuation pattern 52 as used herein, describes a spatial variation in x-ray intensity due to absorption or scattering of incident x-rays by object 20.

In one embodiment, slit collimator 22 is disposed between x-ray source 12 and detector 14 such that, upon exiting collimator 22, the x-rays of attenuation pattern 52 are incident on scintillator 38. Collimator 22 thus determines the slice resolution of imager apparatus 10. In one embodiment, collimator 22 includes a material that is opaque, such as, but not limited to, tungsten. Collimator 22 includes a slit 54, i.e.

a narrow opening in collimator 22. In one embodiment, slit 54 includes a height between approximately 25 μm and approximately 1000 μm. In another embodiment, slit 54 includes a height between approximately 50 μm and approximately 250 μm, and a length comparable to a width of sensor array 16. In another embodiment, imaging system 10 includes a second collimator (not shown), disposed between x-ray source 12 and object 20.

In use, a portion of the x-rays passing through object 20 also pass through slit 54 of collimator 22 and then pass into scintillator 38. The x-rays are absorbed in scintillator 38 in events that result in the generation of optical photons. Scintillator 38 is disposed between first photosensor array 30 and second photosensor array 34, and extends from first photon incident surface 32 to second photon incident surface such that the light generated in scintillator 38 is optically coupled to first photosensor array 30 and second photosensor array 34. Thus, the x-ray pattern 52 representing object 20 is converted to visible light which in turn impinges upon first photosensor array 30 and second photosensor array 34 in detector 18. The incident light is converted to an electrical signal that is representative of the light absorbed. (e.g., by accumulation of charge on respective diodes) by the photodiodes in first photosensor array 30 and second photosensor array 34. Thus, ray pattern 52 is sampled with a detector element 18 pitch size of approximately d and a step size of approximately d/2 when combining the samples from the first photosensor array 30 and second array 34 together to facilitate providing an increase in the detector resolution.

The accumulated charge on the diodes is read out by an array of amplifiers 56. In one embodiment, each sensor element 18 in first photosensor array 30 and second photosensor array 34 includes a single amplifier 56. In one embodiment, amplifiers 56 include charge integrating amplifiers or alternatively current to voltage amplifiers followed by an integrating stage. The total charge incident on each sensor element 18 during any desired period of time is sampled using amplifiers 56 and the resulting data transmitted to a data processor 58 for presentation or further computation.

The data generated, from one position of slit collimator 22 with respect to object 20, represent a view of a single slice of object 20. The data for one view of the single slice are referred to as a frame. For computed tomography, many frames of data are taken at different angles through object 20 for a single slice. In one embodiment, data processor 58 is programmed to control operation of imaging system 10 for changing the relative arrangement of object 20 with respect to x-ray source 12 and collimator 22 for obtaining different views. Processor 58 is further configured to manipulate the digital data of the collection of frames into a useful image that is presented on a display 60. Display 60 may be an electronic display, a hard copy print out, or any other kind of display that is visible or otherwise useful to human beings.

In one embodiment, scintillator 38 includes a plurality of optical fibers 61 bundled together. The optical fibers have an optical axis 62 that is oriented generally orthogonally to the path of the incident x-rays passing through collimator 22. X-rays absorbed in scintillator 38 are converted to visible light, and the optical photons generated generally pass along respective optical axis 62 of a respective fiber where the absorption took place towards first photosensor array 30 and second photosensor array 34, where it is detected by respective photosensitive diodes. The magnitude of charge accumulated in photodiodes 40 is proportional to the intensity of the x-rays passing through slit collimator 22 and that are absorbed in scintillator 38.

In one embodiment, the optical fibers are fabricated from a fiber optic light guiding scintillator material, such as, but not limited to a material provided by Collimated Holes, Inc. of Campbell, Calif. This material is typically provided in 4 inch by 4 inch sheets with lengths of fibers up to 25 mm in thickness corresponding to the dimension "D" in FIG. 2. Pieces of this fiber optic scintillator material can be coupled together to form a scintillator 38 that has dimensions corresponding with a desired arrangement of sensor elements 18. For example, for sensor elements 18 having a length dimension "L" between approximately 1 mm and approximately 35 mm, and commonly about of about 32 mm, two or more pieces of the fiber optic scintillator material are cut and assembled together to cover the desired dimensions of sensor elements 18. The depth, that is, the length of the scintillator (dimension "L") along the direction of the x-ray focal axis of fiber optic scintillator along the focal axis (that is, the distance through which an incident x-ray could travel within the scintillator) is typically in the range of approximately 5 mm. Each of the scintillator optical fibers further exhibits an emission bandwidth (that is, generates optical photons in response to absorption of an x-ray) in a wavelength range of approximately 20 nanometers, with the center of that emission bandwidth being within a range of wavelengths between about 530 nanometers and about 550 nanometers.

In one embodiment, the individual fiber diameters are between approximately 5 μm and approximately 25 μmm, providing a large number of fibers overlying each photosensor 40 in sensor element 18. In one embodiment, the fibers are tightly packed together such that adjoining fibers contact one another, thus letting the fiber diameter effectively determine the number of fibers that can be disposed over the surface area of a photosensor 40. In use, the optical fibers direct at least a portion of the light generated from the absorption of incident x-rays towards first photosensor array 30 and second photosensor array 34 and limits the light from spreading out laterally within scintillator 38 since at least a portion of the light is confined to the fibers by total internal reflection. In one embodiment, the fibers have a length between approximately 2 millimeters and approximately 10 millimeters. In one embodiment, the fibers have a length of approximately 6 millimeters. In another embodiment, scintillator 38 includes a relative thin sheet of scintillator material that does not have optical fibers, such as but not limited to cesium iodide or the like.

In one embodiment, detector 12 includes a first photosensor array and a second photosensor array identical to the first photosensor array. Incident x-rays are collimated to irradiate along the central line of scintillator 38. Additionally, since first photosensor array 30 and second photosensor array 34 are offset by approximately one-half detector pitch normal to the central ray of the incident x-ray, a step size of the sampling to profile 52 can be reduced from approximately d to approximately d/2 where d is the pitch size of the detector element 18 while doubling the Nyquist frequency, thus resulting in an increase in resolution.

While the invention has been described in terms of various specific embodiments, those skilled in the art will recognize that the invention can be practiced with modification within the spirit and scope of the claims.

What is claimed is:

1. A radiation detector, said radiation detector comprising:
an array of detectors, each comprising:
a first offset array comprising a first photon incident surface;
a second offset array comprising a second photon incident surface; and
a scintillator array extending from said first photon incident surface to said second photon incident surface, wherein said first and second offset arrays are separated from each other by said scintillator array and are offset from each other by approximately one-half detector pitch normal to an incident x-ray direction, wherein the offset is formed with respect to an axis of said scintillator array.

2. A radiation detector in accordance with claim 1 wherein said scintillator comprises a plurality of optical fibers.

3. A radiation detector in accordance with claim 2 wherein said plurality of optical fibers are oriented orthogonally to a path of a plurality of x-rays passing through a collimator.

4. A radiation detector in accordance with claim 1 wherein said scintillator comprises a sheet of scintillator material.

5. A radiation detector in accordance with claim 1 wherein said scintillator array is configured to direct at least a portion of a plurality of optical photons to said first photon incident surface and said second photon incident surface.

6. A radiation detector in accordance with claim 1 wherein said first offset array and said second offset array comprises a plurality of sensor elements comprising a plurality of photosensor devices.

7. A radiation detector in accordance with claim 6 wherein said plurality of photosensor devices are disposed in a linear array pattern, such that each photosensor device in said sensor element is disposed adjacent at least one other photosensor.

8. A radiation detector in accordance with claim 7 wherein said photosensor devices are aligned along a sensor element axis corresponding to a longitudinal dimension of said sensor element.

9. A radiation detector in accordance with claim 1 wherein the axis of said scintillator array is perpendicular to the incident x-ray direction.

10. A radiation detector, said radiation detector comprising:
an array of detectors, each comprising:
a first offset array comprising a first photon incident surface and a plurality of sensor elements having an aperture pitch size;
a second offset array comprising a second photon incident surface and a plurality of sensor elements having the aperture pitch size; and
a scintillator array extending from said first photon incident surface to said second photon incident surface, said scintillator array is configured to direct at least a portion of a plurality of optical photons to said first photon incident surface and said second photon incident surface, said scintillator comprising a fiber optic scintillator having a plurality of optical fibers bundled in an array and disposed such that said x-rays are incident on said fiber optic scintillator substantially perpendicular to a respective optical axis of said plurality of optical fibers, said fiber optic scintillator further being optically coupled to at least two of said sensor elements such that said sensor elements are disposed at both ends of the plurality of optical fibers, wherein said first and second offset array sensor elements are separated from each other by said scintillator array and are offset from each other by approximately one-half the aperture pitch size, wherein the offset is formed with respect to an axis of said scintillator array.

11. A method for fabricating a radiation detector, said method comprising:
fabricating an array of detectors, wherein fabricating each detector comprises:
fabricating a first offset array including a first photon incident surface;
fabricating a second offset array including a second photon incident surface;
positioning a scintillator array between the first offset array and the second offset array such that the scintillator extends from the first photon incident surface to the second photon incident surface; and
placing the first and second offset arrays within the detector such that the arrays are separated from each other by the scintillator array and are offset from each other by approximately one-half detector pitch normal to an incident x-ray direction, wherein the offset is formed with respect to an axis of the scintillator array.

12. A method in accordance with claim 11 wherein said positioning a scintillator array comprises positioning a scintillator array including a plurality of optical fibers.

13. A method in accordance with claim 12 wherein said positioning a scintillator array including a plurality of optical fibers comprises positioning a scintillator array including a plurality of optical fibers oriented orthogonally to a path of a plurality of x-rays passing through a collimator.

14. A method in accordance with claim 11 wherein said positioning a scintillator array comprises positioning a scintillator array including a sheet of scintillator material.

15. A method in accordance with claim 11 wherein said positioning a scintillator array further comprises positioning a scintillator array to direct at least a portion of a plurality of optical photons to said first photon incident surface and said second photon incident surface.

16. A method in accordance with claim 11 wherein said fabricating a first offset array and a second offset array comprises fabricating a first offset array and a second offset array including a plurality of photosensor devices.

17. A method in accordance with claim 16 wherein said fabricating a first offset array and a second offset array including a plurality of photosensor devices comprises fabricating a first offset array and a second offset array including a plurality of photosensor devices disposed in a linear array pattern, such that each photosensor device in a sensor element is disposed adjacent at least one other photosensor.

18. A method in accordance with claim 17 wherein said fabricating a first offset array and a second offset array including a plurality of photosensor devices comprises fabricating a first offset array and a second offset array including a plurality of photosensor devices aligned along a sensor element axis corresponding to a longitudinal dimension of said sensor element.

19. A method for fabricating a radiation detector, said method comprising:
fabricating an array of detectors, wherein fabricating each detector comprises:
fabricating a first offset array including a first photon incident surface including a plurality of sensor elements including a plurality of photosensor devices;
fabricating a second offset array including a second photon incident surface including a plurality of sensor elements including a plurality of photosensor devices;
positioning a scintillator array between the first offset array and the second offset array such that the scintillator extends from the first photon incident surface to the second photon incident surface, the scintillator array is configured to direct at least a portion of a plurality of optical photons to the first photon incident surface and the second photon incident surface, the scintillator including a fiber optic scintillator including a plurality of optical fibers bundled in an array and disposed such that the x-rays are incident on the fiber optic scintillator substantially perpendicular to a respective optical axis of the plurality of optical fibers, the fiber optic scintillator further being optically coupled to at least two of the sensor elements such that the sensor elements are disposed at both ends of the plurality of optical fibers; and
placing the first and second offset arrays within the detector such that the arrays are separated from each other by the scintillator array and are offset from each other by approximately one-half detector pitch normal to an incident x-ray direction, wherein the offset is formed with respect to an axis of the scintillator array.

* * * * *